US006341055B1

(12) United States Patent
Guzman-Casillas

(10) Patent No.: US 6,341,055 B1
(45) Date of Patent: Jan. 22, 2002

(54) RESTRAINT-TYPE DIFFERENTIAL RELAY

(75) Inventor: Armando Guzman-Casillas, Pullman, WA (US)

(73) Assignee: Schweitzer Engineering Laboratories, Inc., Pullman, WA (US)

(*) Notice: Subject to any disclaimer, the term of this patent is extended or adjusted under 35 U.S.C. 154(b) by 0 days.

(21) Appl. No.: 09/418,729

(22) Filed: Oct. 15, 1999

(51) Int. Cl.[7] .................................................. H02H 3/00
(52) U.S. Cl. .............................. 361/81; 361/62; 361/87; 361/115
(58) Field of Search .............................. 361/81, 87, 115, 361/93.1, 70, 71, 62, 64, 66, 42

(56) References Cited

U.S. PATENT DOCUMENTS 4,502,086 A * 2/1985 Ebisaka ........................ 361/87

* cited by examiner

Primary Examiner—Stephen W. Jackson
(74) Attorney, Agent, or Firm—Jensen & Puntigam, P.S.

(57) ABSTRACT

A differential relay for protecting a power apparatus portion of a power system, such as a bus line, includes incoming and outgoing power lines on which incoming and outgoing currents are present. The incoming and outgoing currents of each phase are applied through current transformers and then through filtering and normalizing circuits prior to application to the differential relay. The differential relay includes a circuit for determining the presence of an external fault, and maintains security by avoiding a tripping action of the relay for said external faults. Further, the relay includes circuits which in response to the external fault evolving to an internal fault alters the operation of a portion of the relay, by increasing the gain for the restraint current, enabling a directional element for supervision of the differential relay, and for extending the immediate post-fault value of restraint current, and adding a time delay for a selected period of time, all of which are used to identify an external fault evolving into an internal fault.

15 Claims, 3 Drawing Sheets

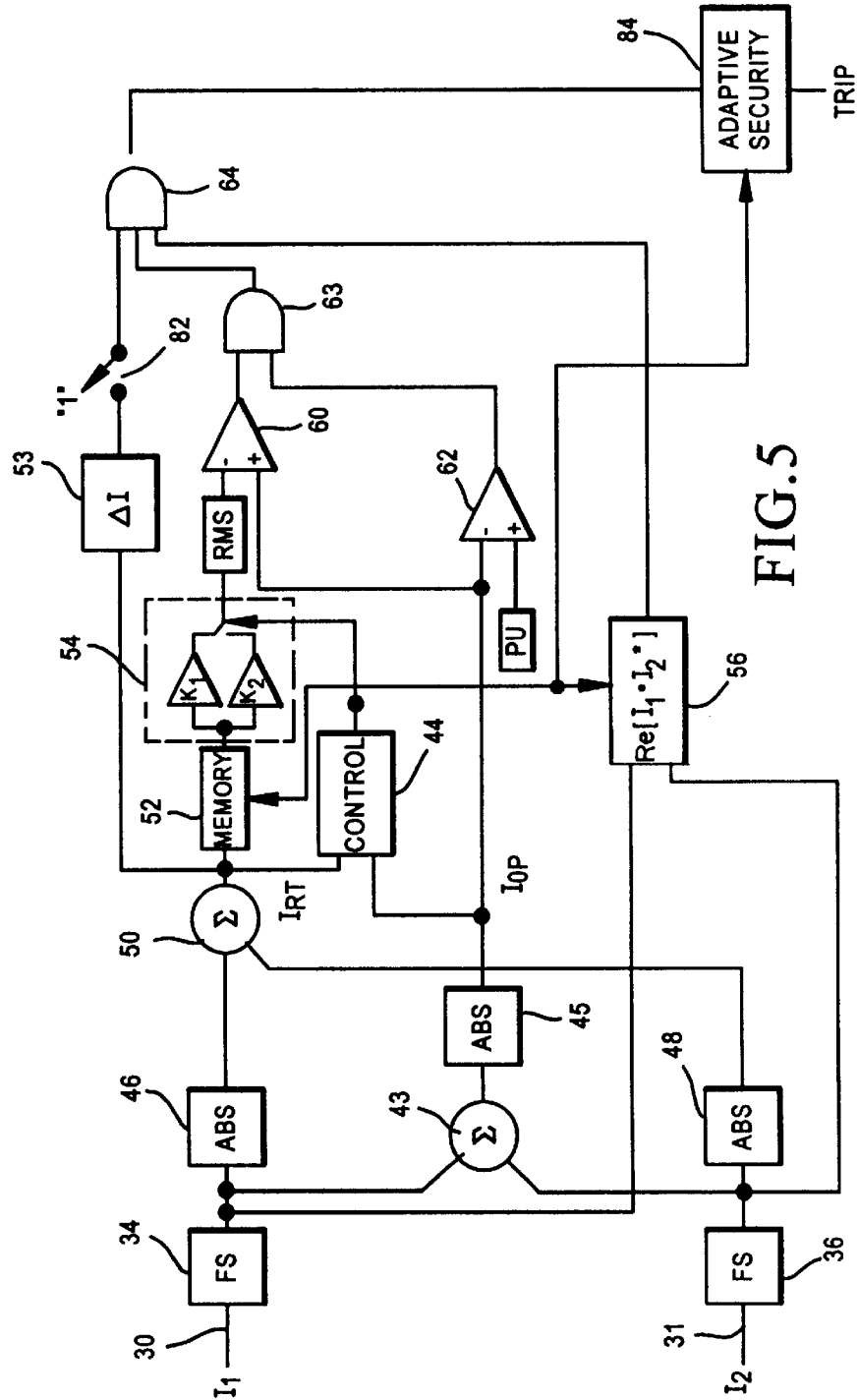

RESTRAINT-TYPE DIFFERENTIAL RELAY

TECHNICAL FIELD

This invention relates generally to differential relays which are used for protection of power system apparatus, and more specifically concerns such a differential relay which is capable of responding to a fault internal to the power system apparatus during the time it is restrained from operating in response to an external fault.

BACKGROUND OF THE INVENTION

Differential relays have been used for many years to protect various power system apparatus, including generators, transformers, power lines and busses, among others. In the basic operation of a differential relay, incoming current to the power system apparatus for each phase (A, B and C) of the power signal is compared against the outgoing current from the power system apparatus. When the two currents are the same for each phase, the power system apparatus is operating properly. However, when an internal fault (internal to the power system apparatus) occurs, the two currents will be unequal, and by processing the two currents properly, an accurate determination of an internal fault can be made. The differential relay then operates (trips a circuit breaker) to remove the power system apparatus from the power system.

FIG. 1 shows a typical connection of a differential relay. A power system apparatus is shown in general block form at 10. Again, this could be several different kinds of apparatus, but in many cases is a bus line. The power system apparatus has incoming current $I_1$ and outgoing current $I_2$ on lines 11 and 13, respectively. Located on line 11 is a first current transformer (CT) 12, while a second current transformer 14 is located on line 13, for one phase of the three-phase power signal. The two CTs reduce the high current on the power lines to an appropraite level for processing by a differential relay 16, which continuously compares the two currents $I_1$ and $I_2$. Similar circuit arrangements are provided for the other two phases of the power signal applied to the power apparatus 10.

In operation, differential relay 16 declares an internal fault condition if a selected percentage of a current value referred to as $I_{OP}$ (operating current value) is greater than a selected percentage of another current value referred to as $I_{RT}$ (restraining current value). $I_{OP}$ is defined as the absolute value of the sum of the vector (phasor) values of $I_1$ and $I_2$ as follows:

$$IOP = |\bar{I}_1 + \bar{I}_2|$$

$I_{RT}$ is defined as the sum of the absolute values of $I_1$ and $I_2$ as follows:

$$IRT = |\bar{I}_1| + |\bar{I}_2|$$

A differential relay is designed to distinguish between an internal fault and an external fault (external to the power apparatus). FIG. 2 shows a typical operating characteristic of a differential relay, in particular sloping line 18. Sloping line 18 differentiates the external fault condition region 20 from the internal fault region 22. The differential relay, as explained above, is designed to operate (trip) for an internal fault but not to trip (an action referred to as blocking) for a fault which is external to the power apparatus. The protected "zone" which defines an internal fault extends between the two current transformers.

Differential relays typically perform well relative to external faults, as long as the individual CTs on the power line reproduce the primary current on the line accurately. When one Ct does not produce the primary current accurately, inaccurate, i.e. fictitious, current is presented to the differential relay which produces an inaccurate result. A typical cause of CT inaccuracy is the CT going into saturation when a fault occurs. When the CT for the $I_2$ (outgoing) current saturates, for instance, the $I_2$ value will be incorrect, and the differential relay may declare an internal fault condition, with a subsequent inappropriate raly operation (trip). This of course is quite undesirable.

Various solutions to the CT saturation problem (misoperation of the differential relay because of CT saturation) have been developed. In one solution, the second harmonic of the current signal is used. In another solution, the characteristic of the differential relay (the sloping line 18 in FIG. 2) is changed by increasing the slope to compensate for the CT saturation. These solutions, however, while providing improved operation in some situations, fail to present relay misoperation in other situations. Further, with respect to the first solution, the trip logic for the differential relay is completely blocked during the time when the second harmonic is above a set threshold. In another solution, the delay is blocked for a fixed period of time (e.g. 7 cycles) after the detection of an external fault condition.

The relay, however, cannot recognize an external fault which evolves to an internal fault or an internal fault which develops independently during the blocking time. This delays unnecessarily the recognition and response to an internal fault.

Still another solution involves the use of phase angle information of the respective currents. The phase angle information remains accurate even during CT saturation conditions. A directional relay, which is a common, well known protective element, uses the phase angle information to distinguish between external and internal faults. The combination of a differential relay with a directional relay can thus provide supervision of the operation of the differential relay to overcome some of the disadvantages of using a differential element by itself. However, such a combined arrangement slows down the operation of the differential relay, which can otherwise be quite fast in operation. This is due to the directional element. Further, the combination cannot detect high resistance faults for incoming and outgoing currents which are 180° out of phase. Hence, it is desirable to have a differential relay which is capable of recognizing an external fault and preventing operation of the relay for that condition, but otherwise be able to operate properly, and as designed, at all times in response to an actual internal fault, even when an external fault evolves into an internal fault. It is also important for the differential relay to maintain its usual high speed operation, without being unnecessarily slowed by additional elements.

Disclosure of the Invention

Accordingly, the present invention is a differential relay for protecting a power system apparatus in a power system, the power system apparatus having a power line input and a power line output, comprising: means for detecting the power signal current present on the power line input and the power line output, respectively; means for recognizing a fault condition in the power system external to the power system apparatus; means for preventing a tripping signal in response to the external fault condition for a selected period of time; and means for recognizing an internal fault during said selected period of time, including the evolution of said external fault into an internal fault, and for permitting a tripping action during said selected period of time.

BRIEF DESCRIPTION OF THE DRAWINGS

FIG. 4 is a block diagram of a portion of the circuit of FIG. 3.

FIG. 5 is a block diagram of an alternative embodiment of the current of FIG. 3.

Best Mode for Carrying Out the Invention

Unlike previous restraining-type differential relays, which, upon recognition of an external fault, absolutely block the differential relay from operating (tripping) for a fixed period of time, e.g. 7 cycles, the differential relay of the present invention, upon recognition of an external fault, is designed to prevent relay operation in response to the external fault, but also to permit relay operation if and when the external fault evolves into an internal fault or if and when an internal fault occurs independently within the time that the relay is being blocked in responding to the external fault. The relay is thus in effect "desensitized" from an absolute blocking approach by being responsive to the internal faults while maintaining security (avoiding tripping) in response to the external fault.

Figure 1:
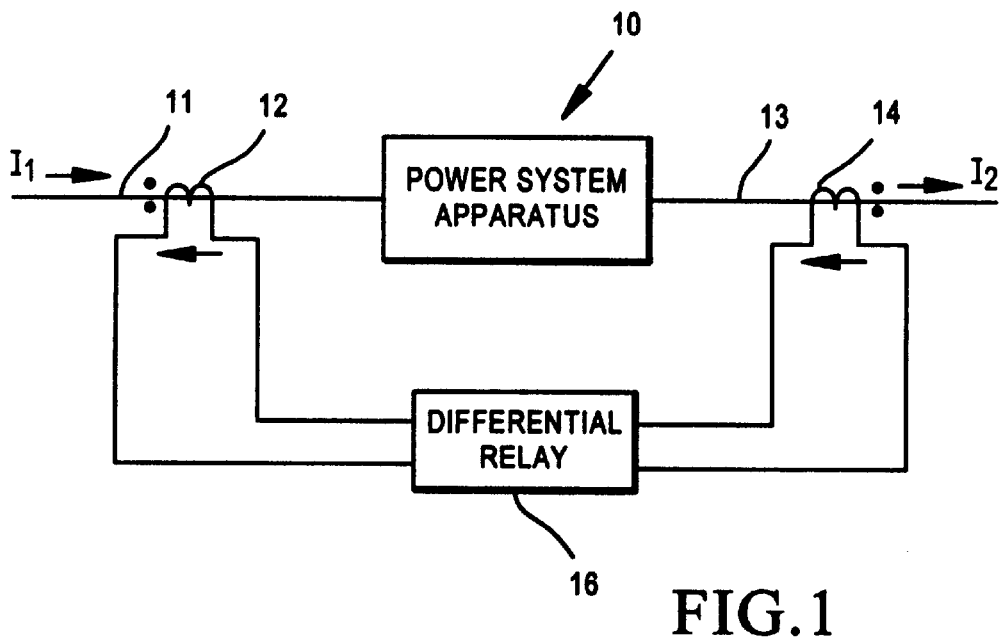
FIG. 1 is a simple schematic diagram showing the connection of a differential relay for a power system apparatus.
Figure 2:
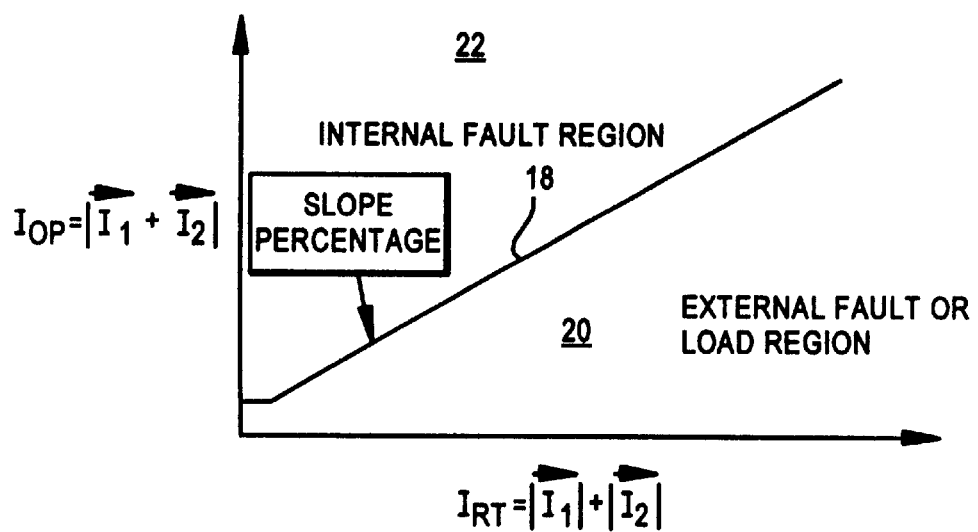
FIG. 2 is a diagram showing the operating characteristic of a differential relay relative to operating current $I_{OP}$ and restraining current $I_{RT}$.
Figure 3:
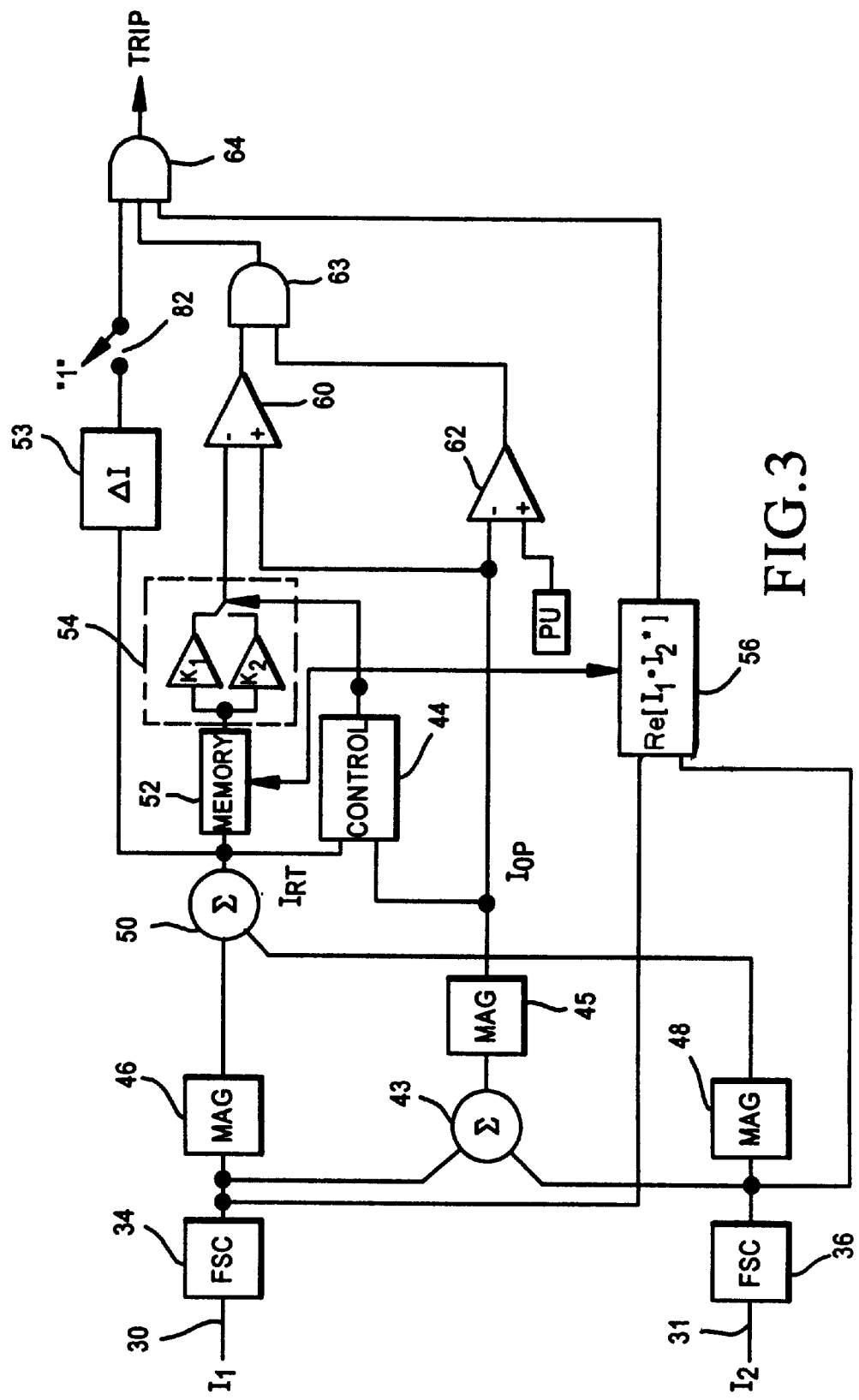
FIG. 3 is a block diagram of the restraining differential relay of the present invention.

The present invention is thus a fundamentally different restraining differential relay. A block diagram of the new restraining differential relay is shown in FIG. 3. The two current inputs to the relay, i.e. the incoming and outgoing currents of a selected phase (A, B or C) relative to a power apparatus protected by the relay are applied to input lines 30 and 31. These currents ($I_1$, $I_2$) are the outputs from the CTs on the power line. The current signals are then applied, respectively, to filtering, scaling and compensation circuits (FSC) 34 and 36.

Referring now to FIG. 4, each FSC circuit includes a series connection of an analog low pass filter 38 and a digital bond pass filter 40. The filtered current signal is then connection compensating (matched) according to the particular power transformer and CT connections by compensation circuit 41. A TAP multiplier 42 compensates for differences between the power transformer and current transformer ratios. It should be understood that such FSC circuits are in general well known.

The output from the FSC circuit is a normalized fundamental component of the input current that can be accurately compared with other normalized current inputs from other terminals in the power system apparatus. The outputs of the FSC circuits 34 and 36 are then applied to a summing element 43, which sums the two values. The output of summing element 43 is directed to an absolute value element 45, which produces a magnitude value from its input. The output from absolute value element 45 is $I_{OP}$, as defined above. This $I_{OP}$ value is then applied as one input to a control logic circuit 44.

The outputs of FSC circuits 34 and 36 are also applied, respectively, to magnitude circuits 46 and 48, which produce magnitude values, which in turn are applied to a summing element 50, the output of which is $I_{RT}$, as defined above. The output $I_{RT}$ from summing element 50 is applied as a second input to control logic circuit 44.

In addition, the outputs of FSC circuits 34 and 36 are applied as inputs to a conventional current directional element 56, while the output of summary element 50 is applied also to a memory circuit 52 and an incremental current supervisor circuit 53.

Control circuit 44 compares the quantities of $I_{OP}$ and $I_{RT}$ on an incremental basis to detect fault conditions. When there is not fault, the incremental values of $I_{OP}$ and $I_{RT}$ are zero. The output of control circuit 44 is thus zero (low), so that the directional element is not enabled. Its output is then set to one (high). The outputs of comparators 60 and 62 will both be zero (low), because $I_{OP}$ is zero and is thus below the established pickup (PU) level (comparator 62), which in the embodiment shown is approximately 1.0 amp. Since at least one of the inputs to AND gate 64 is zero, the output of AND gate 64 is zero, i.e. no trip signal.

Now, when an external fault condition occurs, $I_2$ will have a proper value for a cycle or two, and then decrease dramatically, while $I_1$ will have a proper value (large increase).

Control circuit 44 will declare an external fault by comparing values of $I_{OP}$ and $I_{RT}$. When there is an external fault, the incremental value of $I_{RT}$ is greater than a predetermined threshold (typically twice the nominal current), while the incremental value of $I_{OP}$ does not exceed the predetermined threshold value. After the declaration of the presence of an external fault, the control logic circuit sends a signal to three different circuits in the embodiment shown, namely, restraint quantity memory circuit 52, restraint quantity gain circuit 54, and directional element 56.

The memory circuit 52, when it receives the signal from control logic circuit 44, operates in effect to extend the magnitude of the CT output present immediately following the fault, prior to the effect of saturation, with a decaying exponential with a settable time constant, e.g. 2 cycles. Thus, the value of $I_{RT}$ which is present for approximately one-half cycle following the fault is further is maintained for a limited period of time (as if the CT did not go into saturation).

The signal applied to the gain circuit 54 operates to change the gain for the $I_{RT}$ signal from a first value $K_1$ to a second, higher value $K_2$. In one embodiment, the gain increases from a value of 0.6 to a value of 0.9. This in effect increases restraint quantity, desensitizing the differential element.

The signal from the control logic circuit 44 enables the operation of directional element 56, adding security to the differential element. Directional element 56 operates to compare the phase angles of the compensated current signals from FSC circuits 34 and 36, to discriminate between internal and external fault conditions. In operation, the directional element 56 calculates a torque value, $Re[I_1 \cdot I_2^*]$, and compares the torque value against positive and negative thresholds. The directional element 56 will declare an internal fault condition if the calculated torque is greater than the positive threshold, while it declares an external fault condition if the calculated torque is less than the negative threshold. The directional element in effect supervises the operation of the differential element for a fixed amount of time, but only after the relay detects an external fault condition.

This arrangement has the benefit of the directional element operating only under very specific conditions, and does not result in slowing down the operation of the differential element, which is the case in prior art arrangements where the directional element is continually operating with the differential element.

As can be seen from FIG. 3, the output of the memory circuit 52 is applied to the gain circuit 54. The output of the gain circuit, which is a modified or "adapted" $I_{RT}$, is applied at one input to a comparator 60. This adapted value of $I_{RT}$ is then compared with the value of $I_{OP}$. If the $I_{OP}$ value is greater, the output of comparator 60 will be one (high) when there is heavy CT saturation, i.e. when there is an external fault condition. $I_{OP}$ is also applied to a comparator 62, which compares the value to a threshold (pickup) values. For an external fault with CT saturation, the output of comparator 62 will also be a one (high). The output of AND gate 63 will thus also be high, and is applied to AND gate 64.

The output of the directional element in response to an external fault condition will be zero. This will result in a zero output from AND gate 64, and the relay thus blocks itself from tripping in response to an external fault.

Additional security is provided by the ΔI incremental circuit 53. Circuit 53 compares the $I_{RT}$ value from summing element 50 against a fixed threshold value. The output of the ΔI logic circuit supervises the differential element when switch 82 is closed. When switch 82 is open, as shown, the "one" value is applied to AND gate 64. When switch 82 is closed, and the incremental value of $I_{RT}$ exceeds the threshold, the entire relay circuit is enabled for one cycle, at which point the output of circuit 53 changes back to zero. The ΔI circuit is particularly useful when the current transformer saturation occurs with relatively low currents and long DC time constants exist during energization or during an external fault condition.

Hence, the arrangement of FIG. 3 operates with considerable security to ensure that a tripping action will not be initiated when an external fault occurs.

The circuit will produce a tripping action, however, when an internal fault occurs, including when an external fault evolves into an internal fault, without waiting for a fixed number of cycles, as is the case with the prior art. When an internal fault occurs, $I_{OP}$ is much greater than $I_{RT}$. Further, $I_{OP}$ is large enough to be within the revised (changed) internal fault region created by the change in gain circuit, and thus is larger than the pickup value at comparator 62. The outputs of both comparators are thus high. Further, the output of directional element 56 is high because the two input current values are in phase (for an internal fault). Still further, if the ΔI circuit has been selected and is on, the change in $I_{RT}$ is above the threshold, so its output is one for a cycle, resulting in all of the inputs to AND gate 64 being high. The output of AND gate 64 will thus be high, resulting in a tripping signal to the breaker. The tripping action for an internal fault thus occurs earlier than with conventional differential relays with permanent directional element supervision.

FIG. 5 shows a variation of the embodiment of FIG. 3. This implementation is particularly useful for bus protection with fast operating times. In this case, the differential element uses RMS current values. In another variation, instantaneous values could be used. FIG. 5 also shows an adaptive timer 84 which can be connected as shown to provide additional security to the relay after the relay has detected an external fault condition by delaying a trip signal for a selected time, approximately 0.25 cycles in the embodiment shown. The adaptive timer 84 can also be used in the circuit of FIG. 3 and following AND gate 64.

Hence, an improved restraining differential relay has been disclosed which is capable of very quickly detecting external faults and blocking operation of the relay for an external fault, while at the same time permitting the recognition of an internal fault, which results in operation of the relay (a trip command). Hence, there is very little delay in response to an internal fault.

Although a preferred embodiment of the invention has been disclosed herein for illustration, it should be understood that various changes, modifications and substitutions may be incorporated in such embodiment without departing from the spirit of the invention, which is defined by the claims as follows.

What is claimed is:

1. A differential relay for protecting a power system apparatus in a power system, the power system apparatus having a power line input and a power line output, comprising:

means for detecting the power signal current present on the power line input and the power line output, respectively;

differential element means for recognizing a fault condition in the power system external to the power system apparatus;

means for preventing a tripping signal in response to the external fault condition without blocking the differential element; and means for recognizing an internal fault, including the evolution of said external fault into an internal fault, and for permitting a tripping action for the internal fault, from the time of recognition of the external fault, without any preestablished time delay.

2. The relay of claim 1, wherein the recognizing means includes means for changing the processing of the power signal currents from the input and output power lines in response to the recognition of an external fault.

3. The relay of claim 1, including current transformers for reducing the magnitude of the input and output signal currents to a level suitable for processing by said relay, the relay further including means for filtering and normalizing the reduced current values from the current transformers.

4. The relay of claim 3, wherein the filtering means includes a series connection of an analog low pass filter and a digital band pass filter.

5. The relay of claim 1, wherein said external fault recognizing means includes a control circuit responsive to values of operating current and restrain current, wherein the input signal current is $I_1$ and the output signal current is $I_2$ and wherein operating current is $|I_1+I_2|$ and restraint current is $|I_1|+|I_2|$, and wherein an output signal from the control circuit indicating an external fault condition is applied to at least one of three following elements: (a) a memory element which, in response to the output signal from the control circuit, extends the value of the restraint current for a selected period of time; (b) a gain control circuit which, in response to the signal from the control circuit, increases the gain for the restraint current to produce a revised current value; and (c) a directional element which, in response to the signal from the control circuit, determines whether a fault condition recognized by the relay is an external or internal fault.

6. A relay of claim 5, wherein the signal from the control circuit is applied to all three elements.

7. A relay of claim 5, including means for producing a first comparator output signal when the operating current value is greater than the revised restraint current value and for producing a second comparator output signal when the operating current is greater than a first threshold value, wherein the relay produces a trip signal when the first and second comparator signals are high.

8. A relay of claim 7, including means for comparing an incremental value of restraint current against a second threshold value and for enabling the relay to produce a trip signal during a selected period of time if the incremental value is greater than the second threshold value.

9. A relay of claim 8, including a switch which selectively enables said incremental value comparing means.

10. A relay of claim 6, including means for producing a first comparator output when the operating current value is greater than the revised restraint current value and for producing a second comparator output signal when the operating current is greater than a a first threshold value and for producing a directional element output signal indicative of the internal fault when an internal fault occurs, wherein the relay produces a trip signal when the first and second comparator signals and the directional element output signal are all high.

11. A relay of claim 10, including means for comparing the incremental value of restraint current against a second threshold value and for enabling the relay to produce a trip signal during a selected period of time if the incremental value is greater than the second threshold.

12. A relay of claim 1, wherein the current values are phase values.

13. A relay of claim 1, wherein the current values are RMS (root mean square) values.

14. A relay of claim 1, wherein the current values are instantaneous values.

15. A relay of claim 1, including a timer means for delaying any trip signal output of the relay.

\* \* \* \* \*

UNITED STATES PATENT AND TRADEMARK OFFICE
CERTIFICATE OF CORRECTION

PATENT NO.     : 6,341,055 B1
DATED          : January 22, 2002
INVENTOR(S)    : Armando Guzman-Casillas It is certified that error appears in the above-identified patent and that said Letters Patent is hereby corrected as shown below:

Column 6,
Line 45, the word -- restraint -- should occur between the word "revised" and the word "current".

Signed and Sealed this

Fourth Day of June, 2002

Attest:

Attesting Officer

JAMES E. ROGAN
Director of the United States Patent and Trademark Office